United States Patent [19]

Watts

[11] Patent Number: 5,052,198
[45] Date of Patent: Oct. 1, 1991

[54] BATTERY LOCK AND HOLD-DOWN DEVICE

[75] Inventor: Gary Watts, Riverside, Calif.

[73] Assignee: ElekTrek Partnership, Riverside, Calif.

[21] Appl. No.: 560,088

[22] Filed: Jul. 30, 1990

[51] Int. Cl.[5] .............................................. E05B 73/00
[52] U.S. Cl. ............................................ 70/58; 70/258;
180/68.5; 224/42.38; 248/503; 248/552
[58] Field of Search ...................... 70/14, 57, 58, 258,
70/230; 180/68.5; 224/42.38; 248/551–553,
503, 505

[56] References Cited

U.S. PATENT DOCUMENTS

| | | | |
|---|---|---|---|
| 80,401 | 7/1868 | Feguson | 248/505 |
| 1,745,057 | 1/1930 | Romine | 248/505 X |
| 2,578,008 | 12/1951 | Judd | 248/505 X |
| 3,498,400 | 3/1970 | Hysmith | 70/14 |
| 3,826,115 | 7/1974 | Davis | 70/230 X |
| 3,866,704 | 2/1975 | Bowers et al | 248/503 X |
| 4,028,913 | 6/1977 | Falk | 248/553 X |
| 4,191,034 | 3/1980 | Froess et al | 248/552 X |
| 4,495,787 | 1/1985 | Comstock | 248/553 X |
| 1,577,292 | 3/1926 | Obreiter | 70/258 |
| 2,791,898 | 5/1957 | Pegg et al. | |
| 3,752,254 | 8/1973 | Carley et al. | 180/68.5 |
| 4,249,403 | 2/1981 | Littlejohn | 70/230 |

FOREIGN PATENT DOCUMENTS

| | | | |
|---|---|---|---|
| 198,267 | 5/1923 | Britain | 224/42.38 |
| 617,974 | 11/1926 | France | 180/68.5 |
| 1,334,940 | 10/1973 | Britain | 70/14 |

Primary Examiner—Lloyd A. Gall
Attorney, Agent, or Firm—Morland C. Fischer

[57] ABSTRACT

A lock and hold-down device to surround the top and sides of a battery in a motor vehicle to prevent the unauthorized removal of said battery. The lock and hold-down device includes a pair of identical brackets which are located at opposite sides of the battery and a crossbar which extends across the top of the battery between the side brackets. First ends of the side brackets are secured to a battery plate underneath the battery, and opposite ends of the side brackets have slots formed therein through which to receive the crossbar. One end of the crossbar is bent, and the opposite end of the crossbar is interconnected with a padlock so that the crossbar cannot be removed from the side brackets. A pair of manually adjustable fasteners are moved through holes in the crossbar and into engagement with respective top plates which underlie the crossbar. Accordingly, a downward force is applied to the battery to minimize displacement thereof as the vehicle is driven over a rough or bumpy terrain.

10 Claims, 3 Drawing Sheets

BATTERY LOCK AND HOLD-DOWN DEVICE

BACKGROUND OF THE INVENTION

1. Field of the Invention

This invention relates to a lock and hold-down device for a battery of a motor vehicle by which to prevent the unauthorized removal of the battery from the vehicle and restrain the battery against movement that might be caused by shock and vibration.

2. Background Art

A conventional storage battery is an integral and relatively expensive part of a motor vehicle. However, theft of the battery from the vehicle has become an increasing problem facing all motorists. Consequently, unattractive locking assemblies are sometimes interconnected With the hood of the vehicle in an attempt to prevent the unauthorized raising of the hood and tampering with the parts thereunder. As one alternative to such hood locks, various battery securing devices have been proposed by which to engage the battery and prevent the theft thereof from the battery compartment of the vehicle.

Unfortunately, such battery securing devices are often characterized by various shortcomings. In some cases, the device consists of numerous component parts which increase both the cost of manufacture and difficulty of assembly. In other cases, special tools and/or skill is required to assemble the device around the battery. In still other cases, there is no reliable way to fixedly attach the securing device to the battery compartment of the vehicle so as to prevent access to and removal of the securing device from the vehicle. In yet other cases, the securing device is loosely fitted to the battery, such that rattling and bumping sounds are generated when the vehicle is driven over a rough or bumpy terrain.

Examples of conventional securing devices which may be connected in a motor vehicle to prevent the theft of a battery from the vehicle are available by referring to one or more of the following United States Patents:

| | |
|---|---|
| 1,577,292 | 16 March 1926 |
| 2,791,898 | 14 May 1957 |
| 3,498,400 | 3 March 1970 |
| 3,752,254 | 14 August 1973 |
| 3,826,115 | 30 July 1974 |
| 4,191,034 | 4 March 1980 |
| 4,249,403 | 10 February 1981 |
| 4,495,787 | 29 January 1985 |

SUMMARY OF THE INVENTION

In general terms, a battery lock and hold-down device is disclosed by which to surround the top and sides of the battery of a motor vehicle to prevent the unauthorized removal (i.e. theft) of the battery from a battery plate at the battery compartment of the vehicle. The lock and hold-down device includes a pair of identical side brackets which are positioned in upstanding, parallel alignment with one another at opposite sides of the battery to be protected. First ends of the side brackets are fixedly connected to the battery plate upon which the battery is to be seated. Opposite ends of the side brackets have elongated adjusting slots formed therein. A generally flat, vertically oriented crossbar extends across the top of the battery and between the side brackets for receipt through the slots of said brackets. One end of the crossbar, which projects outwardly from the slot in a first side bracket, is bent, and the opposite end of the crossbar, which extends outwardly from the slot in the second side bracket, contains a hole through which the shackle of a padlock is inserted Accordingly, the bend and padlock located at opposite ends of the crossbar prevent the crossbar from being pulled out of engagement with the side brackets, such that the battery cannot be moved off of the battery plate and removed from the vehicle.

A pair of identical top plates are located at opposite side edges of the battery in front of the side brackets. The top plates have respective noses which extend in end-to-end alignment with one another along the top of the battery and below the crossbar. The crossbar is provided with a pair of twisted (i.e. flat and horizontally oriented) surfaces having threaded holes formed therein. Threaded fasteners are adjustably screwed through the holes in the flat horizontal surfaces of the crossbar and into contact with the noses of the top plates at the top of the battery. Accordingly, a downward force is exerted on the battery by the fasteners to retain the battery upon the battery plate and avoid a possible displacement of battery as a consequence of the vehicle traveling over a rough and bumpy terrain.

DESCRIPTION OF THE PREFERRED EMBODIMENT

Figure 1:
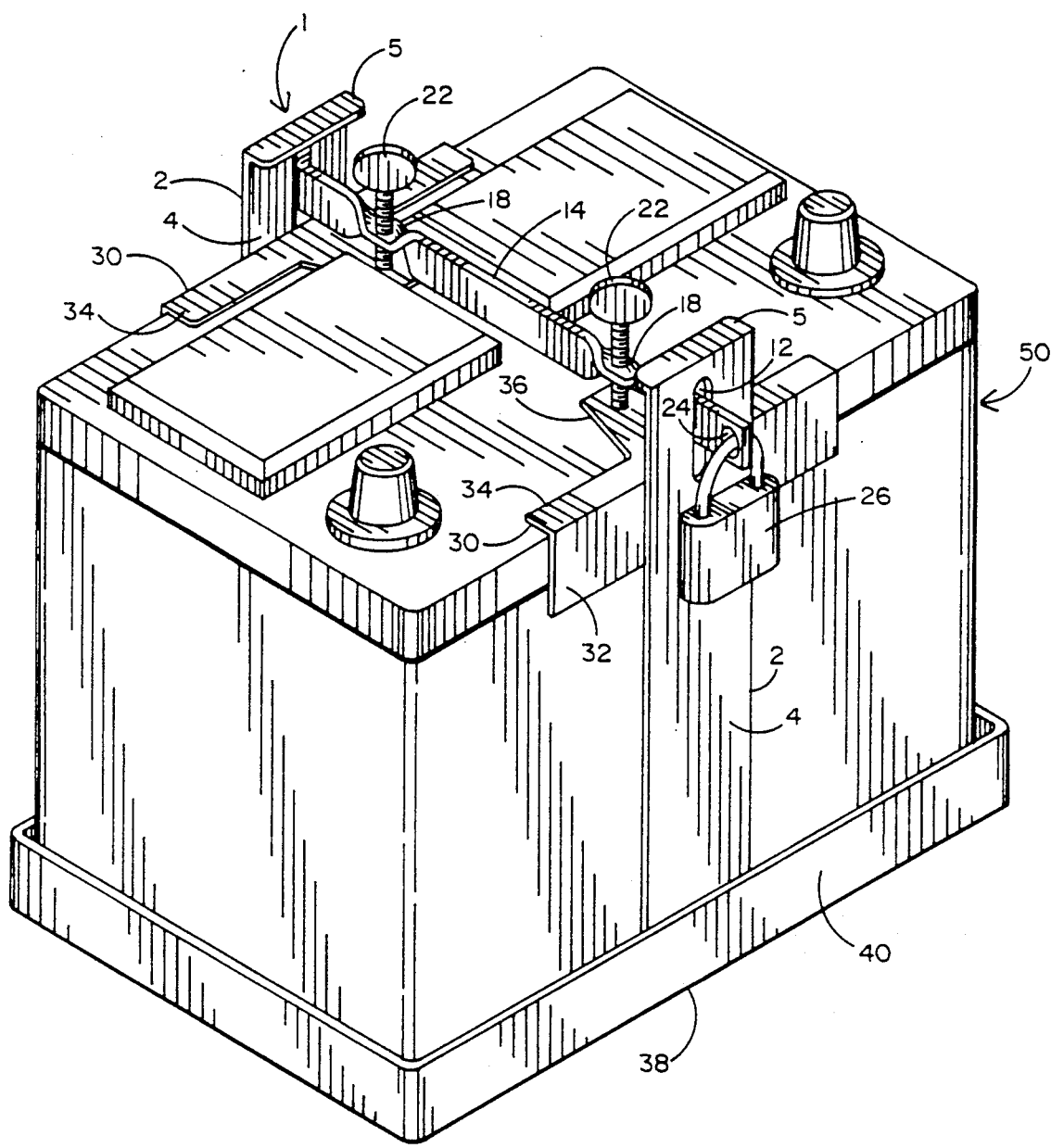
FIG. 1 is a perspective view of the lock and hold-down device of the present invention surrounding and restraining the battery of a motor vehicle.
Figure 2:
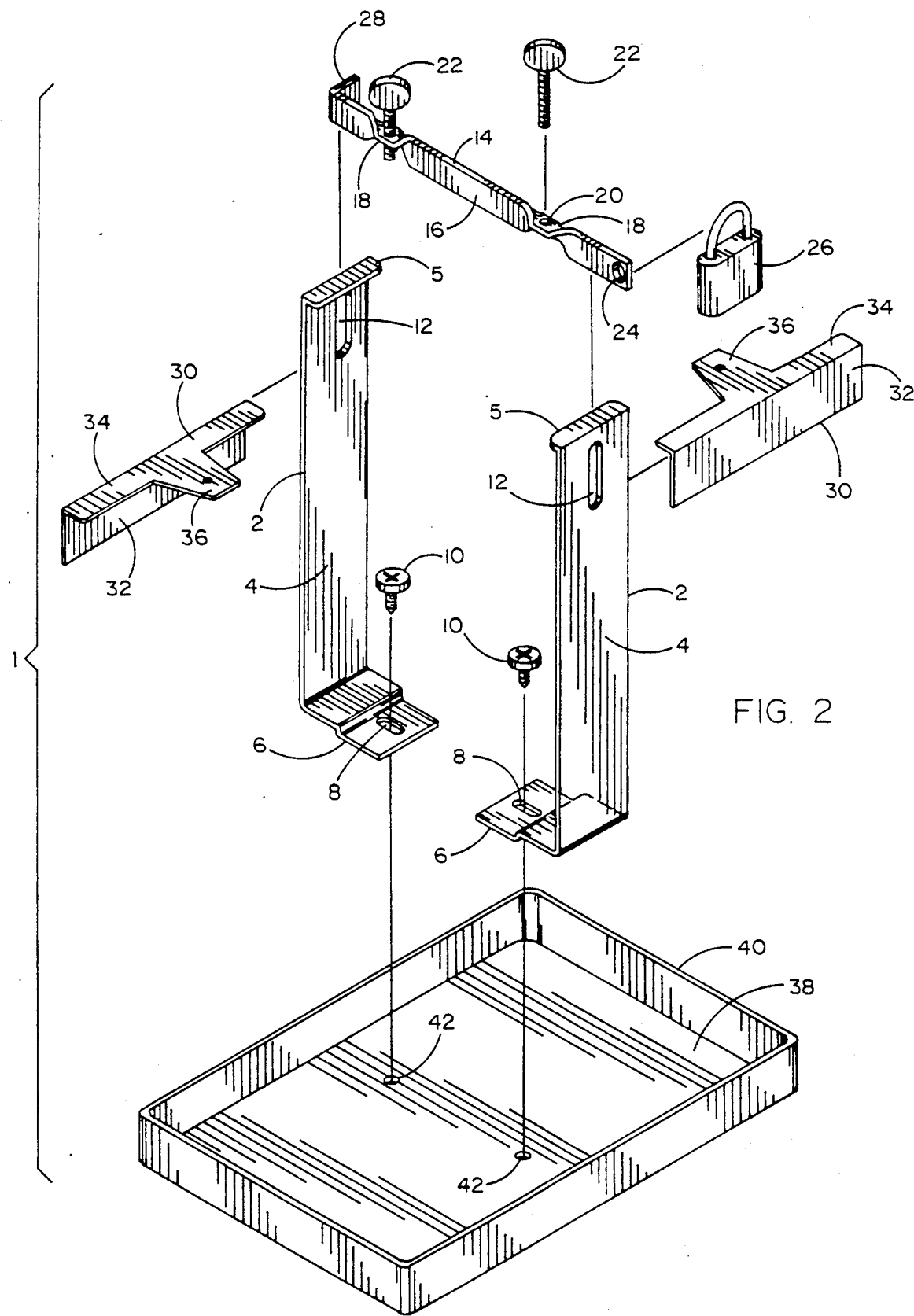
FIG. 2 an exploded view of the battery lock and holddown device of FIG. 1.

The battery lock and hold down device 1 which forms the present invention is now described while referring to the drawings As is best shown in the exploded view of FIG. 2, the lock and hold-down device 1 is a fully detachable assembly including a pair of identical side brackets 2. Each side bracket has an elongated body 4, an inwardly turned lip 5 located at the top of body 4, and a leg 6 perpendicularly aligned with and projecting inwardly from the bottom of said body 4. Side brackets 2 have a length which is slightly larger than the height of a battery 50 (of FIG. 1) with which the lock and hold-down device 1 is to be associated. The legs 6 of side brackets 2 have holes 8 formed therein through which to receive respective fasteners (e.g. screws) 10. Each leg 6 also has a bend formed therein so as to accommodate the head of a fastener 10 when such fastener is received through hole 8. A longitudinally extending (e.g. oval-shaped) slot 12 is formed in each of the bodies 4 of side brackets 2. As will soon be disclosed, the slots 12 are sized to receive therethrough opposite ends of a crossbar 14.

The crossbar 14 includes a generally flat and vertically oriented body 16, except that said body is twisted by 90 degrees to include a pair of flat, horizontally oriented surfaces 18 which are spaced axially from one another. Crossbar 14 has a length which is slightly greater than the width of the battery 50 (of FIG. 1)

across which said crossbar will extend in the assembled relationship. The twisted, horizontal surfaces 18 of crossbar 14 are arranged in perpendicular alignment with respect to the vertically oriented body 16 of said crossbar. A threaded hole 20 is formed through each horizontal surface 18 of crossbar 12 to receive a threaded fastener 22 therethrough, for a purpose that will soon be described It is preferable that fasteners 22 be of the type that are adapted to be manually rotated into and out of the holes 20 in horizontal surfaces 18 without the necessity of a tool. An opening 24 is formed through one end of the body 16 of crossbar 14. Opening 24 is sized to accommodate the shackle of a conventional padlock 26, or the like. The opposite end of the body 16 of crossbar 14 is bent to form an outwardly projecting blocking foot 28.

The battery lock and hold-down device 1 also includes a pair of identical top plates 30 which, in the assembled relationship, are received at opposing side edges along the top of the battery 50 (of FIG. 1) to be protected. More particularly, each top plate 30 includes a downwardly extending side 32 and a laterally extending head 34. A relatively narrow and elongated nose 36 is coextensively formed with and extends from the head 34 of top plate 30.

A battery plate 38, upon which the battery 50 (of FIG. 1) is to be seated, has a rectangular shape and is sized to correspond with the length and width dimensions of said battery. Battery plate 38 has an upwardly turned peripheral lip 40 to prevent the dislocation of a battery which is seated thereon. For purposes of convenience, the battery plate 38 of FIG. 2 could be the existing battery receptacle that is usually found at the battery compartment of most motor vehicles. A pair of threaded holes 42 are formed through battery plate 38 to receive the fasteners 10 which pass through the holes 8 in the legs 6 of side brackets 2. Thus, in the soon to be described assembled relationship, and by virtue of fasteners 10 and holes 42, the battery lock and hold-down device 1 may be screwed down and secured against the battery plate 38.

Figure 3:
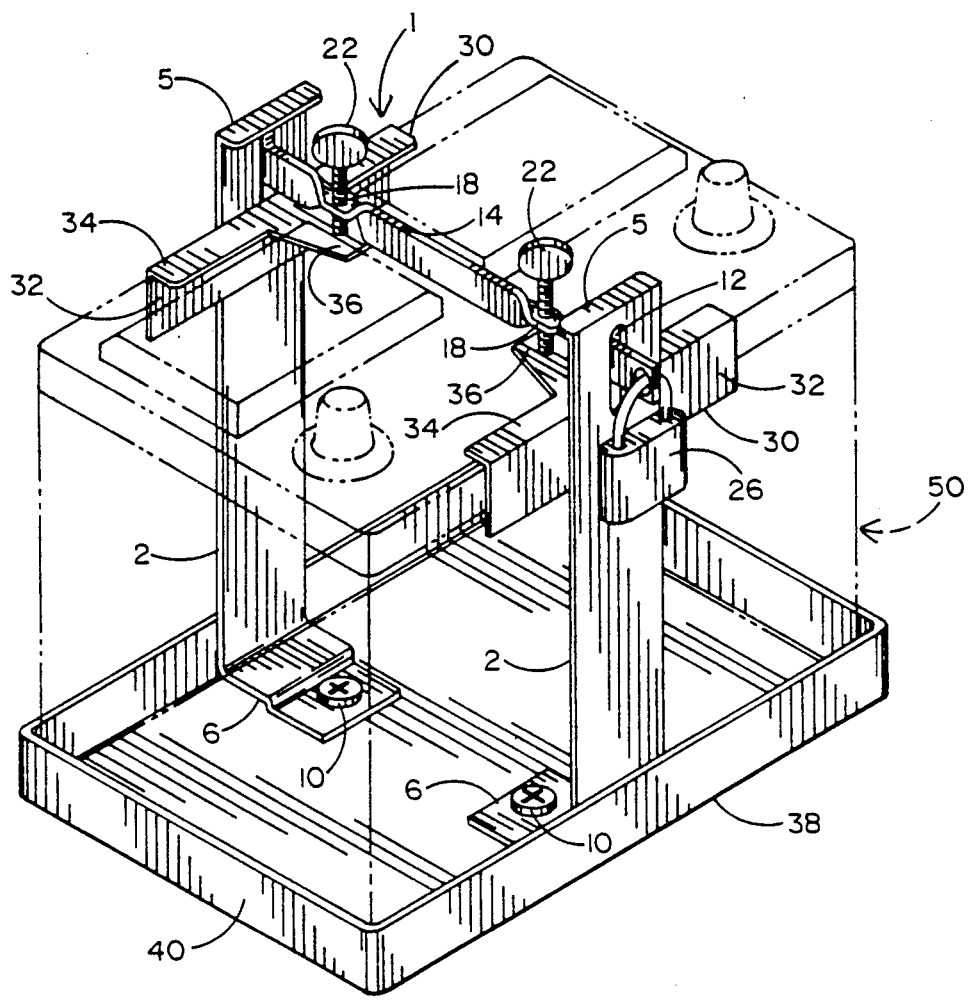
FIG. 3 shows the lock and hold-down device in the assembled relationship interconnected with a battery plate upon which the battery is to be seated.
Figure 4:
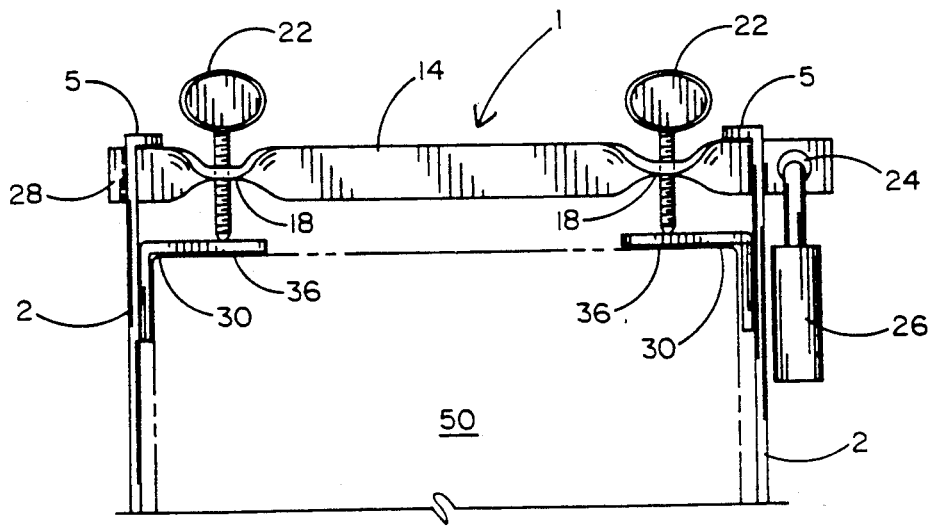
FIG. 4 is an end view of the lock and hold-down device surrounding and restraining the battery.

The battery lock and hold-down device 1 is shown in the assembled relationship surrounding a battery 50 to be protected, while referring currently to FIGS. 1, 3 and 4 of the drawings Prior to seating the battery 50 upon battery plate 38, the side brackets 2 are fixedly attached to said battery plate by inserting the fasteners 10 through holes 8 in legs 6 and into the holes 42 in battery plate 38 (best shown in FIGS. 2 and 3). With side brackets 2 attached to and standing in 38, the battery 50 is positioned upon battery plate 38 by sliding the battery between the side brackets 2 and below the inwardly turned lips 5 thereof, whereby side brackets 4 will face one another at opposite sides of battery 50.

Next, the top plates 30 are placed upon opposite side edges of the battery 50 and in front of respective side brackets 2, such that the sides 32 of top plates 30 extend downwardly along the side of the battery and the heads 34 of top plates 30 are received along the top of the battery. The noses 36 of top plate 30 project outwardly from the heads 34 in end-to-end alignment with one another. Each nose 36 of top plate 30 extends a sufficient distance across the top of battery 50 so as to be located below a twisted, horizontal surface 18 of crossbar 14, for an advantage that will soon be described.

Side brackets 2 are positioned at opposite sides of the battery 50, such that the slots 12 therein are axially aligned with one another, and the flat crossbar 14 which extends across the top of battery 50 is received, in a vertical facing orientation, through slots 12 and below the inwardly turned lips 5 of brackets 2 It may be appreciated that by providing slots 12 with a longitudinally extending (e.g. oval) configuration, the crossbar 14 can ride through said slots so as to have an adjustable elevation for extending across batteries of different heights. What is more the presence of lips 5 above slots 12 reinforces the structural integrity of side brackets 2 so that crossbar 14 may be more reliably retained therebetween. With crossbar 14 extending between side brackets 2, the first end of said crossbar having the opening 24 therein projects outwardly through the slot 12 in one side bracket 2 so as to receive the shackle of padlock 26. Moreover, the bent blocking foot 28 at the opposite end of crossbar 14 projects outwardly through the slot 12 in the other bracket 2 (best shown in FIG. 4). Hence, and as should now be apparent, in the assembled relationship of FIGS. 1 and 3, with padlock 26 closed, the crossbar 14 cannot be removed from between the side brackets 2, and such side brackets 2 cannot be removed from battery plate 38.

That is to say, with the padlock 26 received and closed through the opening 24 at one end of the crossbar 14 and located outside a first of the pair of side brackets 2, said crossbar cannot be pulled in a first direction through the slots 12 and out of engagement with side brackets 2. What is more, with the blocking foot 28 at the opposite end of crossbar located outside the second of the side brackets 2, said crossbar cannot be pulled in an opposite direction through slots 12 and out of engagement with side brackets 2. Accordingly, the crossbar 14 is anchored across the top of battery 50 between side brackets 2, and the unauthorized removal (i.e. theft) of battery 50 from battery plate 38 is thereby reliably prevented. Inasmuch as the battery 50 cannot be unseated from the battery plate 38 (without first opening lock 26 and removing crossbar 14 from slots 12), access is denied to the screws (designed 10 in FIG. 3) which are located beneath the battery to secure side brackets 2 to battery plate 38. Therefore, the unauthorized removal of the battery lock and hold-down device 1 from the battery plate 38 can also be reliably prevented.

As was earlier disclosed, the noses 36 of top plates 30 extend across the top of battery 50 by a distance which is sufficient to cause noses 36 to underlie the flat horizontal surfaces 18 of crossbar 14. Thus, by screwing the fasteners 22 into the holes formed in surfaces 18, such fasteners can be moved downwardly through the crossbar 14 and into contact with the noses 36 of top plates 30. Fasteners 22 can be adjustably tightened against top plates 30 so that a downward force is exerted upon the battery 50. In this manner, battery 50 is held firmly in place upon battery plate 38 so as to overcome the effects of shock and vibration which might otherwise tend to displace the battery as a consequence of the vehicle driving over a rough or bumpy terrain.

The battery lock and hold-down device 1 herein disclosed comprises a relatively few number of parts which may be quickly and easily assembled without special skill or tools. Moreover, the device 1 may be detached from the battery 50 and the battery plate 38 thereunder and completely disassembled into a compact package suitable for transport and storage. Because of the longitudinally extending shape of the slots 12 in side brackets 2 through which crossbar 14 extends, the lock and hold-down device is adapted for use with batteries of varying dimensions. What is more, with the fasteners 22 adjustably moved through the holes in crossbar 14 and into contact with the top plates 30 thereunder, the lock and holddown device 1 of the present invention can be firmly attached to battery 50 so as to avoid rattling and banging during operation of the motor vehicle.

It will be apparent that while a preferred embodiment of the invention has been shown and described, various modifications and changes may be made without departing from the true spirit and scope of the invention.

Having thus set forth a preferred embodiment of the invention, what is claimed is:

1. A lock and hold-down device to prevent the theft of a battery from a battery plate upon which the battery is seated, said device comprising:
   a pair of elongated brackets positioned at opposite sides of the battery, each of said brackets including a first end extending above the top of the battery and having an opening therein and a second end connected to said battery plate, such that said brackets stand upright and in parallel alignment from said battery plate and the openings in said first ends area axially aligned with one another;
   a crossbar having a hole formed in a first end and relatively wide blocking means formed at an opposite end, said crossbar extending across the top of the battery for receipt through the openings in said brackets, such that the first end of said crossbar having said hole projects outwardly from the opening in a first of said brackets to receive a lock through said hole and the opposite end of said crossbar having said blocking means projects outwardly from the opening in the other of said brackets to prevent the removal of said crossbar from said brackets and the battery from said battery plate, said crossbar including at least one flat surface located between the first and opposite ends thereof, said flat surface positioned in spaced, parallel alignment with the top of the battery and having a hole formed therethrough, the opposite ends of said crossbar being bent from said flat surface for receipt through the openings in said brackets; and
   at least one fastener to be moved through the hole in the flat surface of said crossbar and towards the top of the battery to cause a downward force to be exerted thereon for holding said battery on the battery plate.

2. The lock and hold-down device recited in claim 1, wherein the second end of each of said brackets has a leg projecting therefrom, said legs being connected to said battery plate and located underneath the battery when said battery is seated upon said battery plate.

3. The lock and hold-down device recited in claim 1, wherein the openings formed in the first ends of said brackets extend longitudinally along said brackets to permit said crossbar to ride through said openings and extend across the tops of batteries having different heights.

4. The lock and hold-down device recited in claim 1, wherein the opposite end of said crossbar is bent to form said blocking means thereat.

5. The lock and hold-down device recited in claim 1, wherein said crossbar has a plurality of flat surfaces that are spaced from one another between the first and opposite ends thereof, said flat surfaces positioned in spaced, parallel alignment with the top of the battery and having respective holes formed therethrough, the opposite ends of said crossbar being bent away from said flat surfaces for receipt through the openings in said brackets,
   said lock and hold-down device further comprising a plurality of fasteners to be moved through respective ones of said holes in said flat surfaces and towards the top of the battery to cause downward forces to be exerted thereon for holding said battery on the battery plate.

6. The lock and hold-down device recited in claim 5, further comprising a pair of top plates positioned at the top of the battery and underneath respective holes formed through the flat surfaces of said crossbar, such that the fasteners which are moved through said holes engage said top plates to exert said downward forces on the battery.

7. The lock and hold-down device recited in claim 6, wherein said top plates are supported at opposite edges of the battery, each of said top plates having a side portion which engages a side of the battery and a head portion which extends over and engages the top of the battery to lie below the hole formed through one of the flat surfaces of said crossbar so as to receive the fastener which is moved through said hole.

8. The lock and hold-down device recited in claim 1, wherein the opposite ends of said crossbars are twisted so as to be in perpendicular alignment with said at least one flat surface of said crossbar for receipt through the openings in said brackets.

9. The lock and hold-down device recited in claim 1, further comprising a lip connected to and projecting from the top of each of said brackets, said lips facing one another and extending over at least some of the top of the battery for preventing a removal of said crossbar from its receipt through the openings in said brackets.

10. The lock and hold-down device recited in claim 1, wherein said at least one flat surface of said crossbar is horizontal to and aligned parallel with respect to the top of the battery, and the opposite ends of said crossbar which are bent from said flat surface and extend through the openings in said brackets are vertical to and aligned perpendicular with respect to the top of the battery.

* * * * *